United States Patent
Szeto (10) Patent No.: US 9,529,758 B1
(45) Date of Patent: Dec. 27, 2016

(54) MULTIPLE PORT CONFIGURATION

(71) Applicant: NANOPORT TECHNOLOGY INC., Markham (CA)

(72) Inventor: Timothy Jing Yin Szeto, Markham (CA)

(73) Assignee: Nanoport Technology Inc., Markham (CA)

( * ) Notice: Subject to any disclaimer, the term of this patent is extended or adjusted under 35 U.S.C. 154(b) by 0 days.

(21) Appl. No.: 14/875,224

(22) Filed: Oct. 5, 2015

(51) Int. Cl.
*G06F 13/40* (2006.01)
*G06F 13/364* (2006.01)
*G06F 13/42* (2006.01)

(52) U.S. Cl.
CPC ......... *G06F 13/4022* (2013.01); *G06F 13/364* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 7,480,753 B2 | 1/2009 | Bohm et al. | |
| 8,447,890 B1 | 5/2013 | LeTourneur et al. | |
| 8,631,177 B1 | 1/2014 | Thomas | |
| 2004/0019732 A1* | 1/2004 | Overtoom | G06F 13/4022 710/313 |
| 2004/0088449 A1* | 5/2004 | Sakaki | G06F 13/385 710/15 |
| 2006/0179144 A1* | 8/2006 | Nagase | G06F 13/387 709/226 |
| 2006/0221856 A1 | 10/2006 | Quiroz | |
| 2008/0005262 A1 | 1/2008 | Wurzburg et al. | |
| 2010/0049895 A1* | 2/2010 | Liang | H04M 1/72527 710/308 |
| 2012/0331194 A1 | 12/2012 | Crumlin | |
| 2016/0020557 A1* | 1/2016 | Daoura | H01R 13/6205 439/38 |
| 2016/0055009 A1* | 2/2016 | Sakamoto | G06F 9/4411 710/14 |

FOREIGN PATENT DOCUMENTS

WO 2015070321 5/2015

OTHER PUBLICATIONS

International Search Report and Written Opinion mailed Feb. 24, 2016 in relation to PCT Application No. PCT/CA2016/000003, filed on Jan. 5, 2016.
Stanley et al. "On-The-Go Supplement to the USB 2.0 Specification", Revision 1.0, Dec. 18, 2001, pp. 1-74.
"USB On-The-Go Basics" retrieved from http://www.maximintegrated.com/en/app-notes/index.mvp/id/1822 on May 9, 2015.

* cited by examiner

*Primary Examiner* — Idriss N Alrobaye
*Assistant Examiner* — Dayton Lewis-Taylor (57) ABSTRACT

An method of configuring an electronic device having a plurality of serial ports, each of which is configurable to act in either a host port or a slave port mode, includes entering a port configuration state at the device, and, in this port configuration state detecting a trigger event and configuring each of the serial ports of the device in a defined one of its host port or slave port modes. The trigger event may be the proximity of one of the serial ports of the electronic device to a port of another external device in its slave mode. In response, the proximate serial port of the electronic device may assume its host port mode, and the remaining serial ports of said electronic device may assume the slave port mode.

17 Claims, 10 Drawing Sheets

MULTIPLE PORT CONFIGURATION

TECHNICAL FIELD

This relates to intercommunicating electronic devices, and more particularly to devices having multiple configurable communications ports—configurable as host or slave ports, and to methods of configuring such ports.

BACKGROUND

Modern serial protocols allow the interconnection of peripheral devices to other computing devices. Example protocols include the Universal Serial Bus (USB) protocols, as specified in the USB Specifications 1.0, 2.0, 3.0 and 3.1, the contents of which are hereby incorporated by reference. Typically, a computing device controls communication with a peripheral device. The peripheral device is typically referred to as a "slave" to the "host" computing device.

Accordingly, a port on the peripheral device that allows for interconnection with the computing device is referred to as a "slave" port. Likewise, a port on the computing device is referred to as a "host" port.

Some devices blur the distinction between host and slave. For example, a typical cellular telephone, interconnected with a personal computing device acts as a slave to the personal computing device. In other configurations, however, the cellular telephone may act as a host to an external memory. In such instances, the port of such device (e.g. the cellular telephone) may act as either a slave port, or a host port, as specified in the USB-OTG standard.

Multiple devices may be interconnected by way of a hub. Typically a hub includes a single host port, and multiple slave ports. In this way, a single host may be concurrently interconnected with many peripherals.

U.S. Provisional Patent application No. 62/099,941 discloses a configurable device hub whose multiple ports may be arbitrarily assigned to be master or slave ports.

There remains a need to configure a device with multiple configurable ports, depending on its use.

SUMMARY

An example method configures an electronic device having a plurality of serial ports, each which is configurable to act in either a host port or a slave port mode. The method includes entering a port configuration state at the device, and, in this port configuration state detecting a trigger event and configuring each of the serial ports of the device in a defined one of its host port or slave port modes.

In a particular, embodiment the trigger event may be the proximity of one of the serial ports of the electronic device to a port of another external device in its slave mode. In response, the proximate serial port of the electronic device may assume its host port mode, and the remaining serial ports of the electronic device may assume the slave port mode.

In another embodiment, an electronic device includes a plurality of serial ports and a port controller operable to configure each of the plurality of serial ports as a host port or a slave port. The device further includes control logic operable to place the port controller in a port configuration state, and, in this port configuration state detect a trigger event to configure each of the plurality of serial ports of the electronic device in a defined one of its host port or slave port modes.

The device may, for example, be a hub controller, a cellular telephone, a tablet, or other electronic device.

Other features will become apparent from the drawings in conjunction with the following description.

BRIEF DESCRIPTION OF THE DRAWINGS

In the figures which illustrate example embodiments.

DETAILED DESCRIPTION

Figure 1:
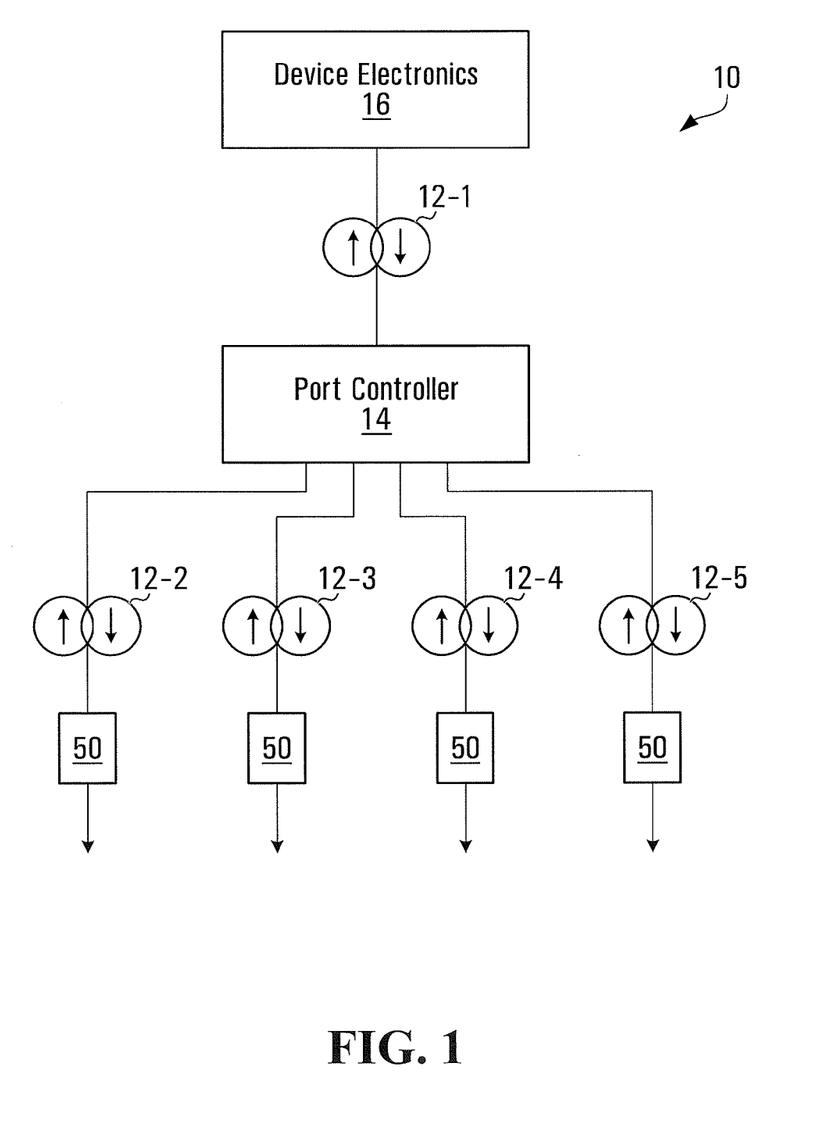
FIG. 1 is a schematic block diagram of an electronic device.

FIG. 1 illustrates an electronic device 10, exemplary of an embodiment of the present invention. As illustrated, device 10 includes plurality of ports 12-1; 12-2; 12-3; 12-4 and 12-5 (individually and collectively port(s) 12), and a device port controller 14. Only five ports 12 are illustrated. Each of ports 12 is configurable as either a host port or a slave port—that is the ports may be operating in either host mode or slave mode. In the example embodiment, device port controller 14 controls the modes of all ports 12 on device 10.

Each of ports 12 may, for example, be a universal serial bus port, compatible with the USB 1.0, 2.0, 3.0 and 3.1 specifications. In other embodiments ports 12 may take other forms—for example ports 12 could be compatible with other serial protocols; ports 12 could be logical wireless ports—using RF or infrared media.

Device 10 may further include a physical port connector 50 for each port 12, as detailed below. Operation of ports 12 as USB ports may be controlled by device port controller 14. Device port controller 14 may also control the configuration of each of ports 12 as a slave port or as a host port, as detailed below.

A suitable device port controller 14 is disclosed in U.S. Provisional Patent application No. 62/099,941. As disclosed in this application, a device controller 14 may for example receive an external signal indicating which of ports 12 assumes the role of host port, and which assumes the role of a slave port.

Figure 2:
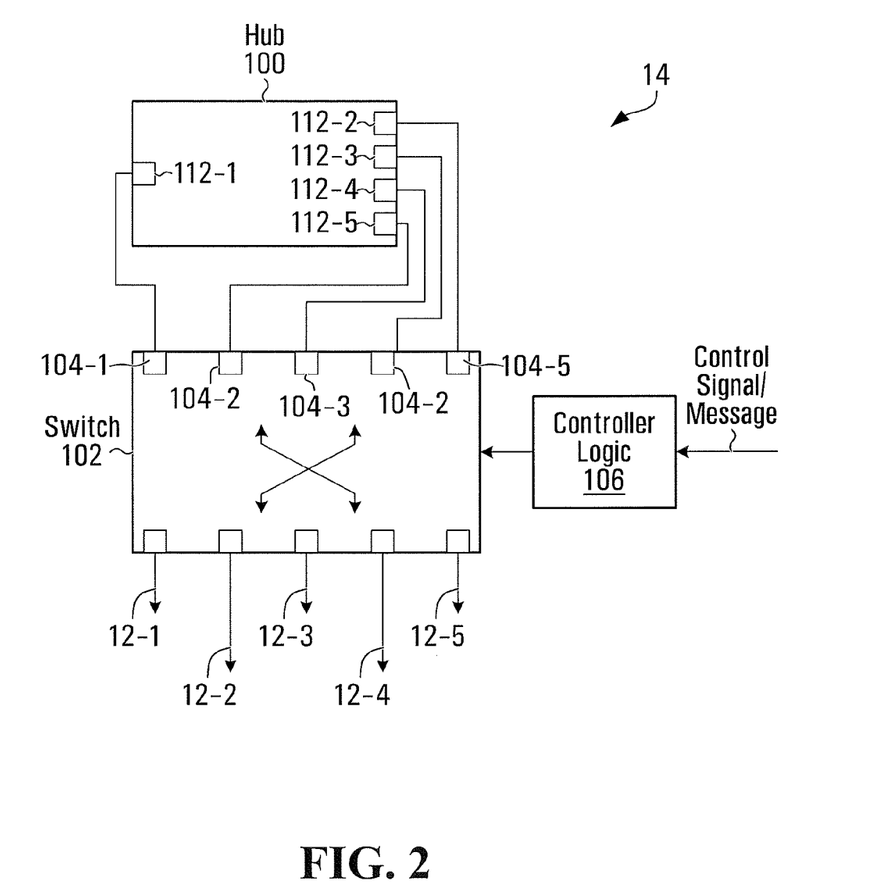
FIG. 2 is a schematic block diagram of an example port controller of the device of FIG. 1.

In a particular embodiment, as illustrated in FIG. 2, device port controller 14 may include control logic 106, a hub 100 with statically assigned ports and a many-to-many switch 102. Hub 100 may be a conventional USB hub, and may include a conventional USB hub controller, and a plurality of ports—statically assigned as host ports and slave ports. In the depicted embodiment, hub 100 includes a single host port 112-1 and four slave ports 112-2, 112-3, 112-4 and 112-5 (individually and collectively ports 112) statically configured. Of course, USB hub 102 could include an arbitrary number of ports—only 5 are illustrated.

A switch 102 includes a plurality of bi-directional internal ports 104-1, 104-2, 104-3, . . . 104-*n*, (individually and collectively internal port (s) 104). Again, only 5 are depicted. Each internal port 104 may be connected to a port 112 of hub 100. As depicted, internal port 104-1 is connected to hub port 112-1; internal port 104-2 to hub port 112-2; and so on.

Switching fabric 102 also interconnects ports 12-1, 12-2, 12-3, 12-4, 12-5 of device 10. Switching fabric 102 may be a conventional switch providing selectable bi-directional communication, non-blocking paths through the switching fabric 102, each path connecting an internal port 104 with a port 12. In this way, each port 12 may be selectively connected to host port 112-1 or a slave port 112-2, 112-3, 112-4 or 112-5 of HUB 100. Selection of these paths is controlled by controller logic 106, which performs the selection according to a control signal received by controller 106. In one specific embodiment, switching fabric 102 may include a conventional multiplexer/demultiplexer.

If a USB host port 112-1 is connected to a port 12 (e.g. port 12-1), that port 12-$a$ may function as a host port. Conversely, if a given port 12 (e.g. port 12-2) is connected to a slave port 112-2, 112-3, 112-4, 112-5, that port 12-$b$ may function as a slave port. Likewise, a given external device interconnected to a host port 12-1 should be configured to function as a host device; likewise devices interconnected with a slave port 12-2 should be configured to function as a slave device. Insofar as a particular interconnected device can act as both host and slave, this device may be dynamically configured to properly interact with an interconnected one of ports 12.

Switching fabric 102 may be re-configured dynamically during operation, thereby allowing the slave/host roles of devices interconnected to ports 12 to be assigned dynamically during operation, e.g., under software control. For example, an interconnected device may be assigned a new host/slave role and transition to this new role dynamically. That is, an interconnected device may transition from a host to slave, or vice versa.

This interconnect of switching fabric 102 may be changed by switch controller 106, e.g., upon request through a control signal. For example, switch controller 106 may receive a control signal requesting that port 12-2 be connected to internal port 104-2.

Notably, one of ports 12 (in the depicted embodiment port 12-1) of device 10 (FIG. 1) may further be interconnected with local device electronics 16, capable of acting as a host or slave to peripheral devices interconnected with the remaining ports 12-2; 12-3; 12-4; and 12-5.

Figure 3:
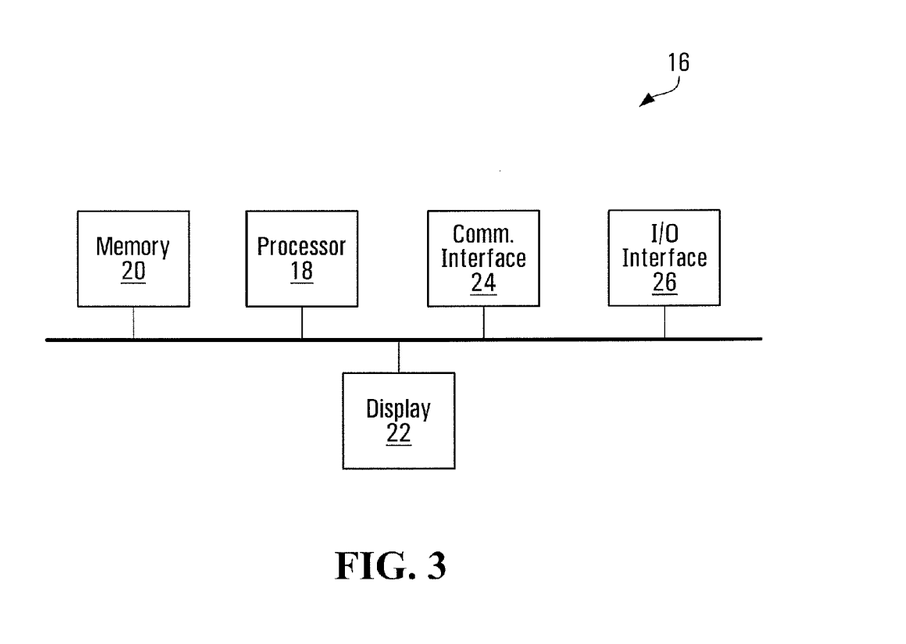
FIG. 3 is a block diagram of electronic components at the device of FIG. 1.

As illustrated in FIG. 3, device electronics 16 may for example, include, one or more processors 18, processor readable memory 20, an optional display 22, one or more input/output interfaces 26; and one or more communications interfaces 24 (e.g. Bluetooth; WiFi; cellular network radio; NFC interface; or the like)—all, as for example, found in a contemporary computing device (e.g. smart phone, tablet, etc.).

In the depicted embodiment, device electronics 16 form part of device 10. However, in other embodiments device electronics may form part of a different/separate device. In a practical embodiment, device 10 may be, or may be a part of, a mobile computing device such as a cellular telephone or tablet device or laptop computer, desktop computer, workstation, server, personal digital assistant, interactive television, video display terminal, gaming console, electronic reading device, or any other portable electronic device, or a combination of these. Device 10 may be integrated in other devices—such as a household appliance (e.g., fridge, stove, oven, washing machine, stereo, exercise bike, alarm clock, or the like), or a vehicle (e.g., on a vehicle dashboard), etc. In certain embodiments, device 10 may similarly form a part of a peripheral device, such as a peripheral memory; display; printer; or the like.

In such an embodiment, ports 12-2, 12-3, 12-4, and 12-5 may have physical port connectors located on the casing of device 10, exposing ports 12-2, 12-3, 12-4 and 12-5 for interconnection with other devices. Port 12-1 may be internal to device 10 to interconnect device electronics 16 to the remaining ports of device 10. In other embodiments, device 10 may be a hub, with all of ports 12-1; 12-2; 12-3; 12-4, and 12-5 having exposed port connectors for interconnection with other devices.

Suitable port connectors 50 (FIG. 1) may be standard USB compatible connectors—for example USB Type A Plug/Jack; USB Type B Plug/Jack; USB 2.0/3.0 Micro USB plug/jack; etc. Alternatively, port connectors 50 may be magnetic connectors, as for example detailed in PCT Publication WO2015/070321, the contents of which are hereby incorporated herein by reference. If port 12 is wireless, a suitable port connector 50 may take the form of logical port on a wireless interface.

To allow flexible interconnection, each port 12 may be associated with one or more connectors that may be physically exposed for interconnection with complementary port connectors of other devices. In an embodiment, each port 12-2, 12-3, 12-4 and 12-5 may be associated with a connector 50 located near the physical corner of a casing of device 10. Optionally, two connectors may be located near each corner.

Figure 4:
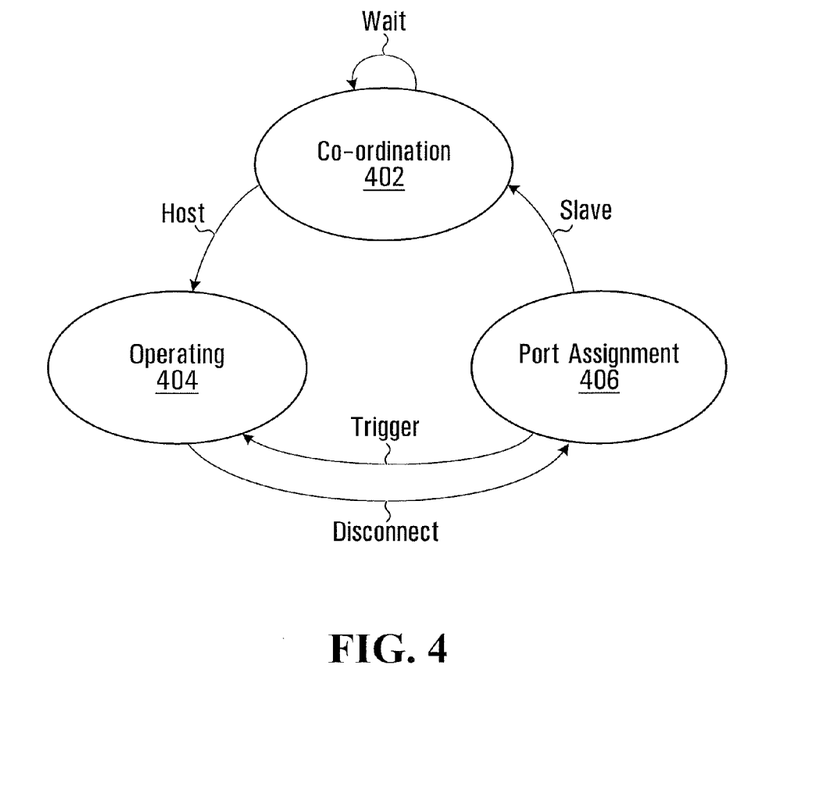
FIG. 4 is a state diagram of states of the port controller of FIG. 2.

Port controller 14 may assume a number of states—as depicted in the state diagram of FIG. 4—including a co-ordination state 402, and operating state 404 and an intermediate port assignment state 406. In co-ordination state 402, device 10 decides whether to act as a host or slave to other similar devices, as further discussed below.

Initially, port controller 14 may assume its co-ordination state 402 to assess whether device 10 should assume the role of host or slave among several other interconnected devices. In this state, the modes of ports 12 of device have typically not been assigned/configured.

Device electronics 16, for example, under software control, may cause port controller 14 to transition from this coordination state 402 and cause device 10 to assume the role of host or slave, and also configure ports 12 of device 10. In other embodiments, port controller 14 may include its own software/firmware (for example, stored on a persistent computer readable memory) to allow port controller 14 to interact with external processors/controllers directly without utilizing device electronics 16. In yet other embodiments, functions of controller 14 may be incorporated into device electronics 16.

If device 10 is to act as a host, port controller 14 may transition to operating state 404, with a defined one of its ports 12 configured to be a host port. For example, device electronics 16 may signal to device port controller 14 that device 10 is to act as host, and port 12-1, interconnected with device electronics 16, is to assume the role of host port. Once port 12-1 has been configured as a host port, the remaining ports (e.g. ports 12-2; 12-3; 12-4; 12-5) may be configured as slave ports, completing the transition to operating state 404. Device electronics 16 may then assume the role of the host.

If, on the other hand, device 10 is to act as a slave, or is waiting to determine whether it should act as a host in the presence of another device, port controller 14 may assume a port assignment state 404 and await a trigger event before assigning the mode of each of ports 12, and assume an operating state 404, as detailed below.

Figure 5A:
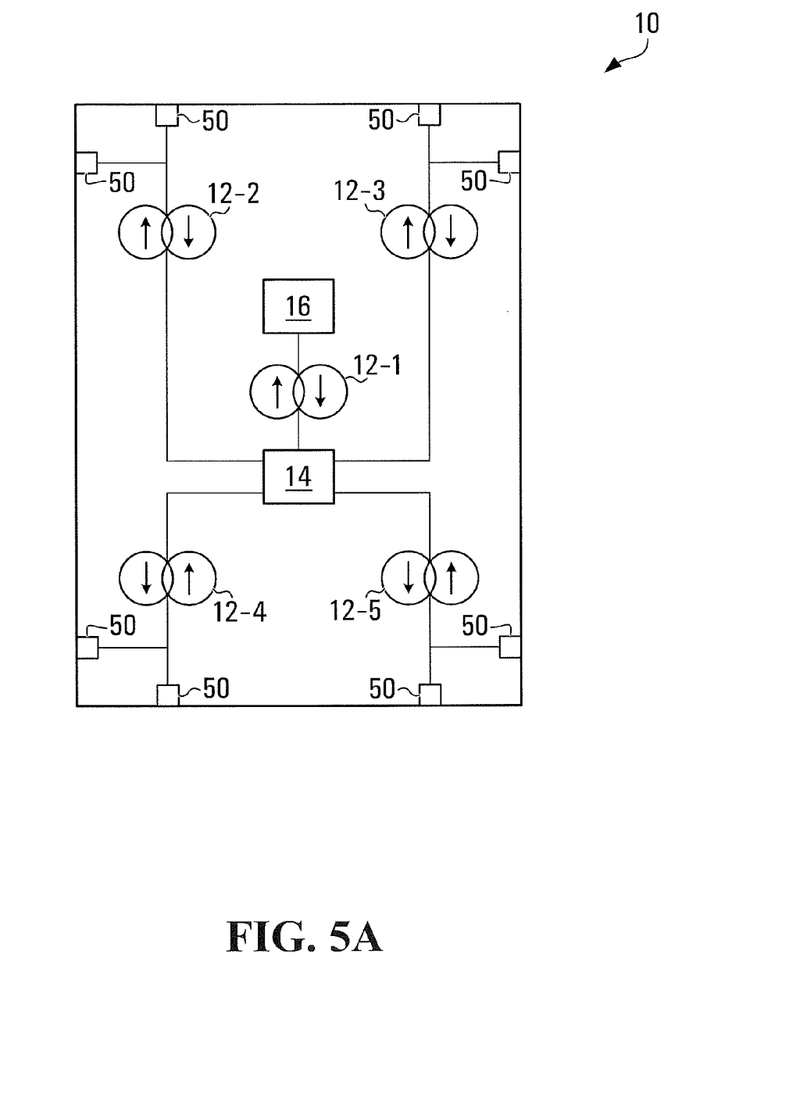
FIGS. 5A-5B are schematic block diagrams of the electronic device of FIG. 1, in operation.
Figure 5B:
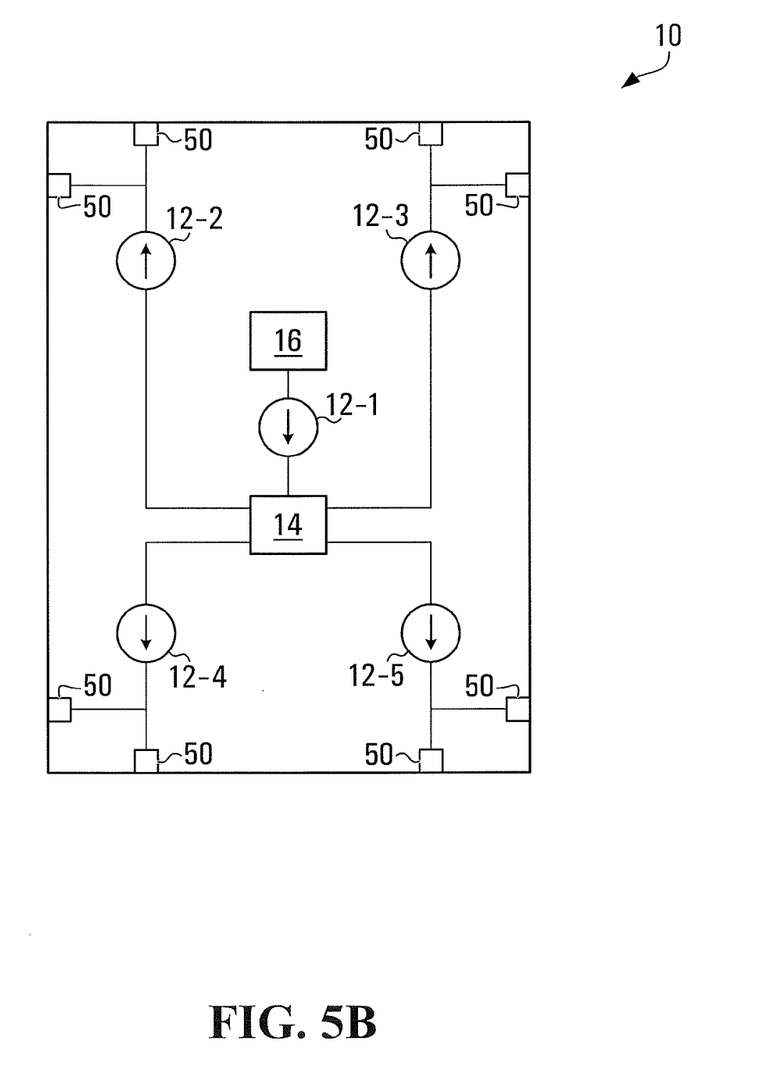
Figure 6A:
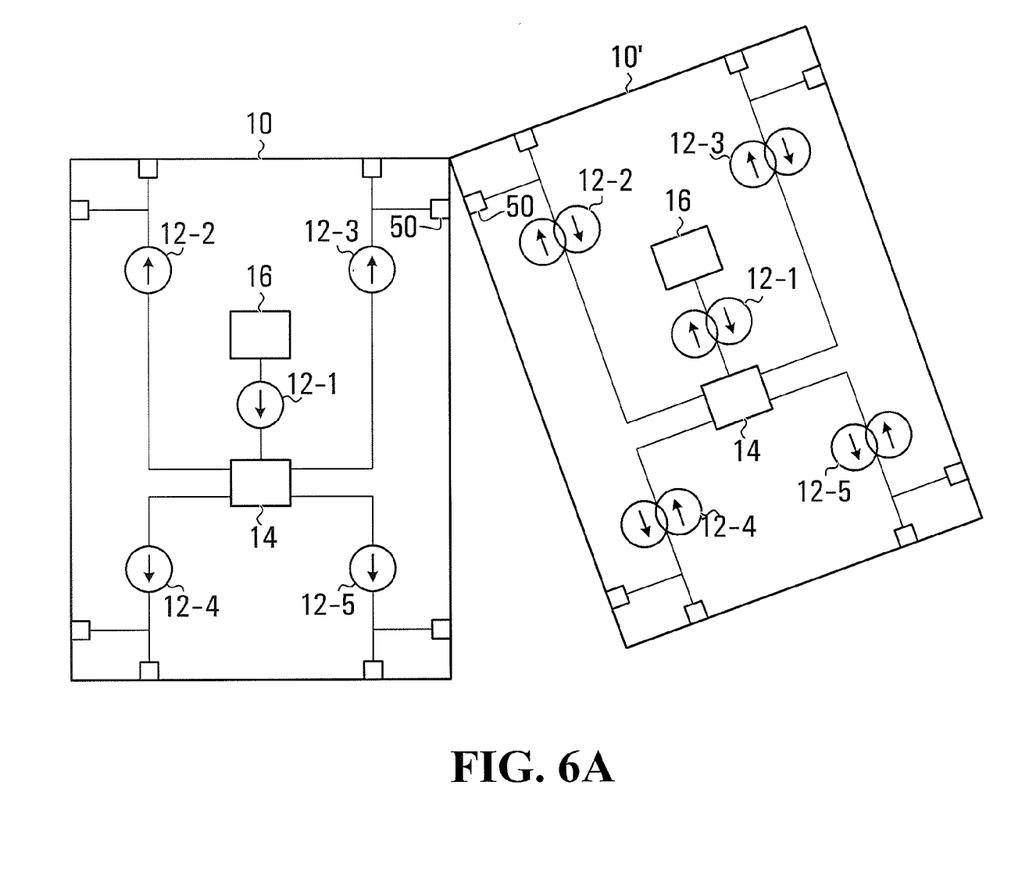
FIGS. 6A-6B are schematic block diagrams of two electronic device of FIG. 1, in operation.
Figure 6B:
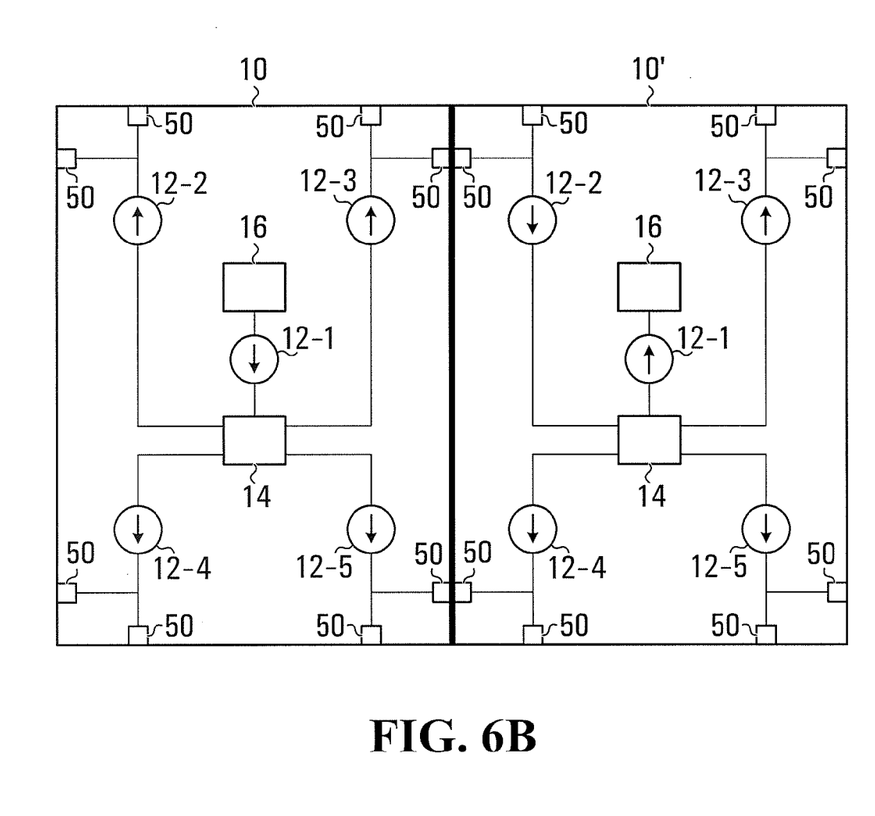
Figure 7A:
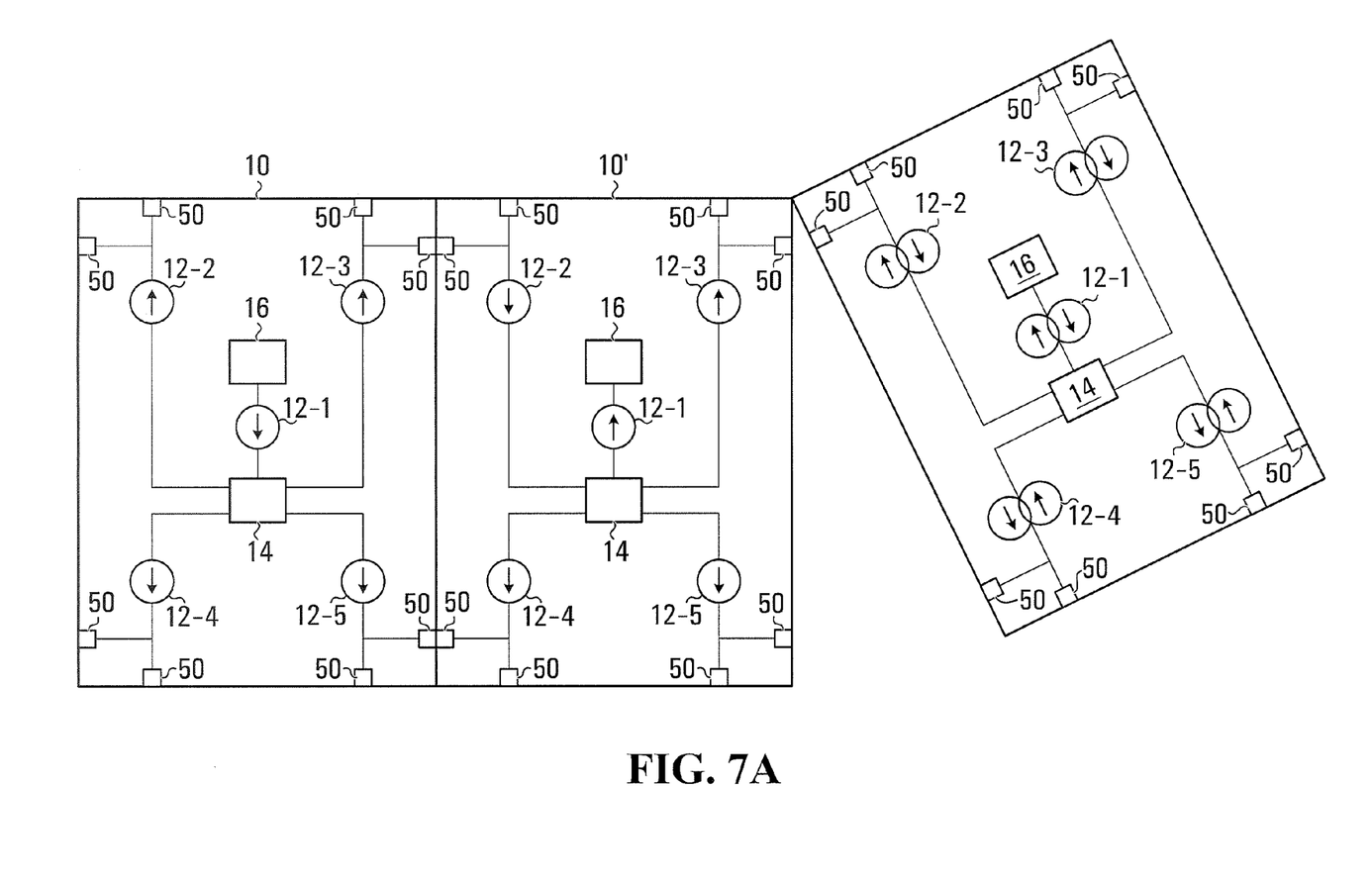
FIGS. 7A-7B are schematic block diagrams of two electronic device of FIG. 1, in operation.
Figure 7B:
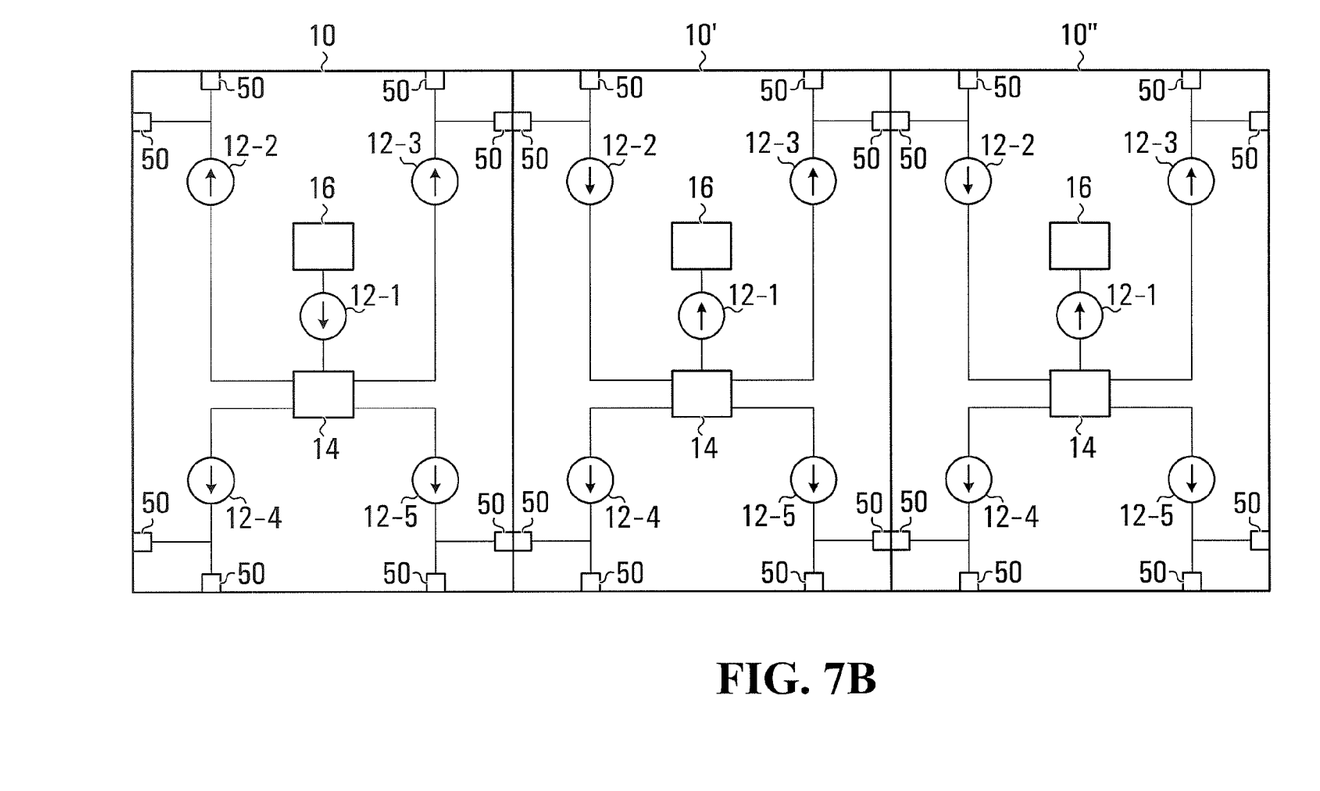

Operation of device 10 may be better appreciated with reference to FIGS. 5A-7B. In FIGS. 5A and 5B, as single device 10 is depicted. In FIGS. 6A-7B, several devices 10'/10" that are materially the same as device 10 are depicted. These additional devices have the architecture of device 10, and are identified as device 10' (FIG. 6A-6B); device 10" (FIGS. 7A-7B). For illustration, individual components of devices 10'/10''' are assumed to be the same as device 10 and will therefore not be re-introduced.

As illustrated in FIG. 5A, a device 10 may initially be in a configuration mode with port controller 14 in its coordination state 402. Software at device 10 may now issue a signal or message to port controller 14 that device 10 is to act as a host to further interconnected devices. The software at device 10, may for example be executing at device electronics 16 interconnected with device 10, for example to port 12-1 of device 10. The software at device 10 may issue the message in response to an external trigger—such as a wireless signal (e.g. WiFi, Bluetooth, NFC field message exchange), or external interaction (e.g. user interface interaction; button press; device interconnection; or the like). In other embodiments, port controller 14 may receive a signal from an external device directly, for example by detecting the state of device 10 through polling signals at one of ports 12 of device 10, generated by device 10 acting as host in accordance with the USB protocols. To that end, control logic 106 of port controller 14 may include a suitable interface (e.g. wireless or other) for receiving such a signal/message, and be software programmable to allow it to operate autonomously of device electronics 16.

The message to port controller 14 of device 10 may include an identifier of the port configuration—including which of ports 12 of device 10 is to be configured as a host port and which of ports 12 is to be configured as a slave port. Possibly the message need only identify the host port, with the remaining ports by default assuming their slave mode.

Typically, although not always, port 12 (e.g. port 12-1) that is interconnected with device electronics 16 will be configured as a host port, as illustrated in FIG. 5B. The remaining ports 12-2, 12-3, 12-4, 12-5 having port connectors 50 exposed for interconnection of other device will be configured as slave ports. In the illustrated embodiment, two port connectors 50 are associated with each port—one is on the top/bottom of device 10; the other is on the left/right side of device 10. Once ports 12 are configured port controller 14 of device 10 may assume its operating state 404. In other embodiments, only a single port connector may be associated with each port.

In the example of FIG. 5B, port 12-1 of device 10 is interconnected with device electronics 16 and configured in host mode. The remaining ports 12-2, 12-3, 12-4 and 12-5 of device 10 are configured as slave ports, in slave mode. Port controller 14 of device 10 is now in its operating state 404.

Next, as illustrated in FIG. 6A, a second device 10' is introduced. Initially, its port controller 14 is in its coordination state 402. Software at device 10 may sense the proximity of device 10' with device 10 and signal the role of device 10' relative to device 10, to device 10'. For example, device 10' may determine that it has been interconnected with a port that is in its slave mode, of a device in host mode (i.e. a slave port) as describe below. Alternatively, device 10 may provide a signal/message to device 10' that device 10' is to assume the role of slave, and that port controller 14 of device 10' should assume its assign port state 404. Again, the software at device 10 may be executing at device electronics 16 or port controller 14.

Once in assign port state 404, port controller 14 of device 10' awaits a trigger event before configuring the operating modes of ports 12-1, 12-2, 12-3, 12-4 and 12-5 of device 10'.

In the particular embodiment of FIG. 6B, the trigger may be a physical connection or contact with or proximate one of ports 12-1, 12-2, 12-3, 12-4 or 12-5. In particular, proximity of one of these ports—for example connector 50 of port 12-2 of device 10' with a slave port of a device in its operating state (e.g. connector of port 12-3 of device 10) acting a host, may cause port controller 14 of device 10' to configure the first proximate/contact port (e.g. port 12-2) as a host port, as depicted in FIG. 6B.

Proximity may be sensed in any number of way—for example, by sensing magnetic or electrical interconnection of connector 50 of port 12-2 of device 10' with connector 50 of port 12-3 of device 10. If the physical connectors of ports 12 is magnetic, as for example detailed in WO2015/070321, proximity may be detected by detecting the presence of the magnetic field of a complementary port 50 of device 10', for example, by way of a hall-effect switch. Alternatively, physical proximity may be electrically detected—by for example detecting a change in capacitance at port 12. If ports 12 are wireless, their wireless interconnection—for example by way of establishing a connection, or exchanging control signals—may be detected. Other ways of detecting proximity will be readily apparent to those of ordinary skill. Alternatively, proximity may be determined in other ways—by external proximity sensors on devices 10/10' proximate connectors 50; by exchanging messages between port controllers 14 of the devices 10/10'; or otherwise.

Optionally, the operating state of port 12-3 of device 10 may be detected to determine if port 12-3 of device 10 is operating in host or slave mode, and to determine if port 12-3 of device 10 is in communication with an upstream host device. For example, if port 12-3 of device 10 is a slave port of a host device (i.e. device 10 is acting as host, or interconnected with another upstream host device), the host device will periodically poll for slaves according to the USB protocol at port 12-3 of device 10. If such polling signals are received at port 12-2 of device 10', then port 12-3 of device 10 may be assumed to be a slave port (for connecting to slaves). Conversely, if no such polling signals are received, then port 12-3 of device 10 is assumed to be a host port (for connecting to a host).

Alternative, the state of port 12-3 of device 10 could be queried by port controller 14 of device 10' to ensure that port 12-3 of device 10 is in its operating state 404.

Controller 14 may configure the remaining ports 12-1, 12-3, 12-4 and 12-5 of device 10' as slave ports. Optionally, controller 14 may disable those connectors or ports that are interconnected with other slave ports of the same device to which its host port is connected. So for example, controller 14 could disconnect connector 50 of port 12-4 on the left side device 10' from port 12-4 of device 10'.

Slave port 12-3 of device 10 may now exchange data with host port 12-2 of device 10'. Device 10' may enumerate itself to device 10 in accordance with the USB protocols. Device 10 may then control device interaction with device 10'. Optionally, controller 14 of device 10 may now disable any previously configured slave port not actively interconnected with device 10' (e.g. ports 12-2, 12-4 and 12-5 of device 10).

Conveniently, port controller 14 of device 10' may thus both establish the interconnection of device 10' with device 10, and also configure other exposed ports 12-3, 12-4, and 12-5 of device 10' to allow further like devices to be interconnected.

Additional devices may now be brought into contact with the device pair 10/10' of FIG. 6B, and be interconnected to slave ports of either device 10 or 10'. This is exemplified in FIGS. 7A and 7B. Again, a third device 10" is introduced. Initially, its port controller 14 is in its coordination state 402. Software at device 10 (or device 10') may sense the proximity of device 10" with device 10 (or device 10') and again provide some signal or message to device 10" allowing device 10" to assess its role relative to device 10', and transition to a suitable operating state. This may, for example, be accomplished by providing a signal/message to device 10" that device 10", like device 10', is to assume the role of slave, and that port controller 14 of device 10' should transition to its assign port state 404 in slave mode.

Once in assign port state 404, port controller 14 of device 10" again awaits a trigger event before configuring the modes of ports 12-1, 12-2, 12-3, 12-4 and 12-5 of device 10", as depicted in FIG. 7A. In particular, proximity of one of these ports—for example port 12-2 of device 10" with a slave port of a device in its operating state (e.g. any slave port of device 10 or device 10"—with its port controller 14 in operating state 404) may cause port controller 14 of device 10" to configure the first proximate/contact port (e.g. port 12-2) as a host port. In the illustrated example, proximity of port 12-2 of device 10" to slave port 12-3 of device 10' provides the trigger event.

Proximity may again be detected by detecting physical proximity or interconnection of any of ports 12 of device 10" with a slave port of device 10' or device 10.

In any event, the now proximate/interconnected port 12-2 of device 10" may be configured by controller 14 of device 10" as the host port of device 10". Again, the operating state of the port controller 14 of device 10' may first be verified. Controller 14 of device 10" may configure the remaining ports 12-1, 12-3, 12-4 and 12-5 of device 10" as slave ports, as illustrated in FIG. 7B. Again, connectors 50 of slave ports of device 10" interconnected with connectors 50 of slave ports of other devices may optionally be disabled or disconnected. That is, connector 50 of port 12-4 that is interconnected with connector 50 of port 12-5 of device 10' may be physically disconnected from port 12-4 to allow any other exposed connector of port 12-4 to be interconnected to another connector of another port of another device (not specifically illustrated).

Effectively then, device 10" may be chained to two already configured device 10 and 10'. Again, device electronics 16 of device 10" may now assume the role of a slave to device electronics 16 of device 10, interconnected upstream of device 10". Effectively, a USB bus is established through device 10' which connects device 10 and device 10".

As host ports are disconnected, port controller 14 of device 10' or 10" may revert to its port assignment state 406, as illustrated in FIG. 4, or to its co-ordination state 402.

As should now be appreciated, several devices of the form of device 10, that may otherwise act identically, may individually or collectively establish which of these devices is to act as master (host), and which of these are slave devices, when interconnected. Multiple slave devices may be interconnected with a master, either directly to one of several slave ports of the master device, or through one of several slave ports of a slave device. Each slave device may configure itself so that one of its ports, interconnected with a slave port of another device is configured as a host ports, while other ports which may be exposed for interconnection of other devices, may be configured as slave ports.

In alternate embodiments, ports 12 may be wireless ports, capable of establishing wireless connections with proximate ports on other devices. In such cases, proximity of ports may be sensed by sensing wireless signals emanating with a proximate device—by for example detecting a wireless connection on a port; detecting the signal strength of a radio on the proximate device; or otherwise.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A method of configuring an electronic device having a plurality of serial ports to a hub of said electronic device, each of said plurality of serial ports configurable to act in either a host port mode or a slave port mode to said hub of said electronic device, said method comprising:
    entering a port configuration state, and in said port configuration state detecting proximity of one of said serial ports of said electronic device to a port to a second hub of an external device, said port to said second hub acting in a slave mode to said second hub; and
    in response to said detecting, configuring the one of said serial ports of said electronic device in its host port mode to said hub of said electronic device, and the remaining ones of said serial ports of said electronic device in their slave port mode.

2. The method of claim 1, further comprising transitioning into said configuration state after coordinating the role of said electronic device with said external device.

3. The method of claim 1, wherein said plurality of serial ports are formed on said hub.

4. The method of claim 1, wherein said detecting comprises detecting interconnection of a connector to said port to said second hub of said external device to said one of said serial ports of said electronic device.

5. The method of claim 4, wherein said connector comprises a magnetic connector.

6. The method of claim 5, further comprising disabling slave ports on said external device that are not interconnected with said electronic device.

7. The method of claim 4, wherein said external device comprises a hub controller.

8. The method of claim 1, further comprising configuring said electronic device as a slave.

9. The method of claim 1, wherein each of said serial ports comprises a universal serial bus (USB) port.

10. The method of claim 1, wherein said serial ports comprise wireless ports.

11. Non-transitory persistent computer readable medium storing computer executable instructions configuring a device to perform the method of claim 1.

12. An electronic device comprising:
    a plurality of serial ports to a hub;
    a port controller operable to configure each of said plurality of serial ports as a host port or a slave port;
    control logic operable to place said port controller in a port configuration state, and, in said port configuration state detect proximity of one of said serial ports of said electronic device to a port to a second hub of an external device, said port to said second hub acting in a slave mode; and
        configure the one of said serial ports of said electronic device to said hub of said electronic device as a host port, and the remaining ones of said serial ports of said electronic device as slave ports.

13. The device of claim 12, wherein each of said serial ports comprises a universal serial bus (USB) port.

14. The device of claim 12, wherein each of said serial ports includes a magnetic connector.

15. A serial hub comprising the device of claim 12.

16. An electronic peripheral comprising the device of claim 12.

17. A cellular telephone comprising the device of claim 12.

* * * * *